A. L. CHAMBERLIN.
STORAGE BATTERY PLATE.
APPLICATION FILED MAY 31, 1911.
1,135,499.
Patented Apr. 13, 1915.
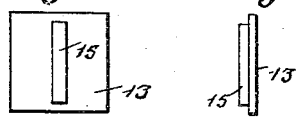
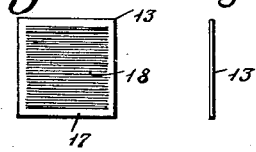
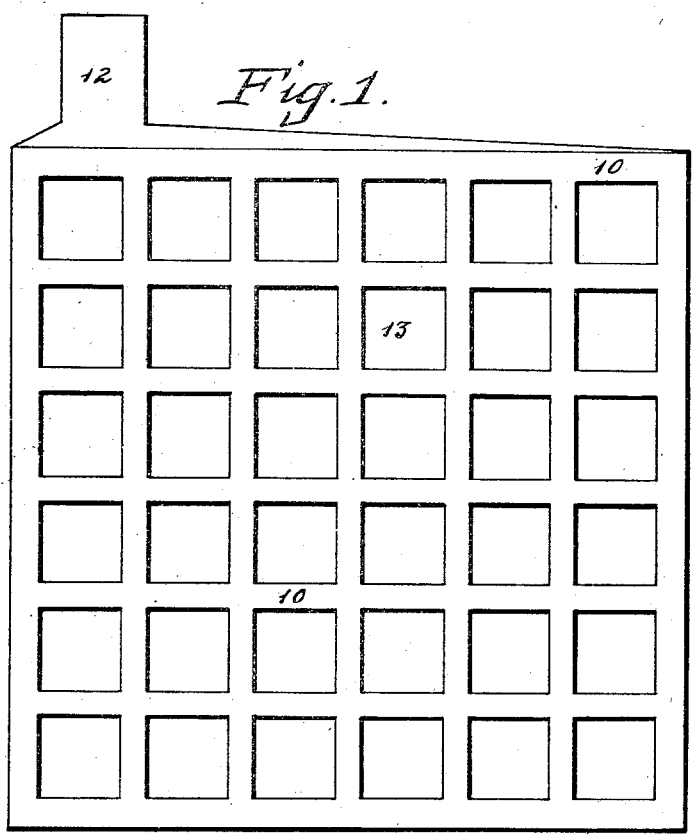
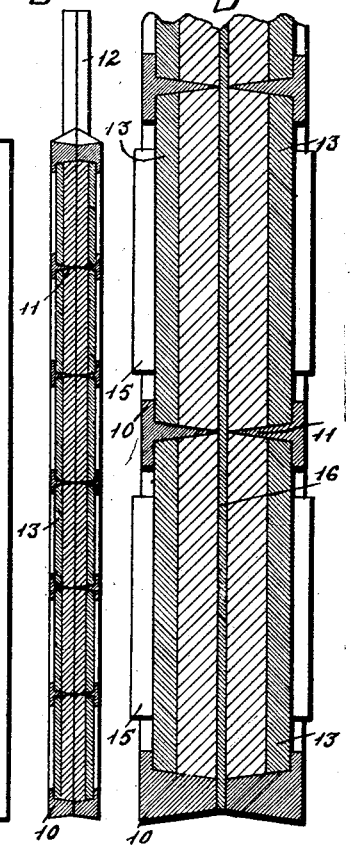
Witnesses.
W. A. Loftus,
A. G. Hague
Inventor.
Albert L. Chamberlin
by J. Ralph Druig Atty.

UNITED STATES PATENT OFFICE.

ALBERT L. CHAMBERLIN, OF DES MOINES, IOWA.

STORAGE-BATTERY PLATE.

1,135,499.  Specification of Letters Patent.  Patented Apr. 13, 1915.

Application filed May 31, 1911. Serial No. 630,442.

*To all whom it may concern:*

Be it known that I, ALBERT L. CHAMBERLIN, a citizen of the United States, residing at Des Moines, in the county of Polk and State of Iowa, have invented a certain new and useful Storage-Battery Plate, of which the following is a specification.

My invention relates to that class of storage battery plates in which the active material is retained within a frame or grid composed of electrical conducting material.

The object of my invention is to provide a battery plate of simple, durable and inexpensive construction which may be readily, quickly and easily made and assembled and in which the active material is readily accessible by the battery acids or electrolytes; and also in which the active material is permanently retained in position within the frame or grid so that in the event that it should become softened it cannot escape from the frame or grid and become deposited in the bottom of the cell in which the battery is contained and to thereby provide a battery plate especially desirable for use in connection with automobiles for the reason that the active material cannot be dislodged from the plate by shaking or jarring even though it should become soft.

My invention consists in certain details, in the construction, arrangement and combination of the various parts of the device, whereby the objects contemplated are attained, as hereinafter more fully set forth, pointed out in my claim and illustrated in the accompanying drawings, in which:

Figure 1 shows a side elevation of a battery frame or grid embodying my invention. Fig. 2 shows a vertical, central, sectional view of same. Fig. 3 shows an enlarged, detail, sectional view of a portion of same in the modified form. Fig. 4 shows a front elevation of one of the porous plates used to retain the active material in the frame or grid. Fig. 5 shows a side elevation of same. Fig. 6 shows a plan view of the modified form of porous retaining plate, and Fig. 7 shows a side elevation of same.

Referring to the accompanying drawings, it will be seen that my improved battery plate is formed of two independent sections, each section being composed of a number of transverse and vertical strips 10 having on their inner edges the tapered ribs 11. Each frame or grid is also provided with a terminal section 12 extending upwardly. The two frames or grids are placed side by side, as shown in Figs. 2 and 3, with the small ends of the ribs 11 adjacent to each other. These frames or grids are made of material that is a good conductor of electricity and that will not be affected by the battery acids or electrolytes.

Within each of the rectangular spaces formed by the strips 10, I place a plate 13 made of porous material and having its edges beveled to fit the inclined ribs 11. These plates 13 may be made of porous tile material or any other porous or perforated material that will not be affected by the action of acids or electrolytes. In some instances, I also employ on the said porous plates a rib 15 extending outwardly from the plate 13 to a point slightly beyond the outer surface of the frame or grid so that separator plates may be placed adjacent to the frame or grid and be held spaced apart from the frame or grid by said ribs. After the porous plates 13 are placed in position as before described, the active material in either plastic or dry form is placed in the frame or grid to completely fill the space between the plates 15 and the narrow edges of the ribs 11. The composition employed in this active material does not of itself comprise any part of this invention and any of the well known active materials for this purpose may be employed. After the two frames or grids are thus filled with the active material, I place a sheet of material such, for instance, as lead, indicated by the numeral 16, between the two frames or grids and then permanently connect the two frames or grids by burning them together at suitable intervals or in any other desirable and ordinary manner so that the frames or grids are firmly held together and are also connected electrically. By this means the sheet lead plate is firmly held in electrical contact with the grids at many points and it is also held in position in the center of the active material so that the current of electricity flowing through the battery plate will be distributed evenly throughout the entire amount of active material thus increasing the capacity of the battery plate both to receive electricity and to discharge it. In Fig. 2 of the drawings, the small vertical line indicates the plate 16 but the view is on too small a scale to show this thin sheet in section.

In the modified form shown in Figs. 6 and

7, I show as a substitute for the plates 13 a plate made of material such as celluloid having solid or unbroken marginal edges 17 and a central portion that is cracked or broken at 18 to thereby form a plate that has considerable strength and that resists the action of acid and that will also be porous enough to permit electrolyte to penetrate it without permitting the active material to leak through. One advantage of this form of plate is that it is inexpensive and can be made quite thin and is not easily broken.

In practical use, it is obvious that the two frame or grid sections may be molded in the ordinary manner of the ordinary materials used for this purpose and then each frame or grid may be laid on a flat support and the porous plates may be readily and quickly placed in the rectangular spaces of the frames or grids between the ribs 11; then the active material may be placed in position in the ordinary manner and the sheet of lead placed on top of one frame or grid and the other frame or grid placed on top of the sheet of lead and then the edges may be electrically and mechanically connected by burning or any other ordinary manner.

It is obvious that my improvement adds only slightly to the expense of manufacture and that the active material may be acted upon by the electrolyte through the porous plates. Further, the said active material cannot in any way become detached from the plate because it is wholly inclosed in the frame or grid and between the porous plates. Hence the life of a battery constructed of such plates is practically unlimited.

I claim as my invention:

An improved battery plate, comprising two frames or grids, made of conducting material, a series of porous plates made of nonconducting material fitted within the frames or grids and a layer of active material between the frames or grids in electric contact with both frames or grids, said frames or grids being in electric contact with each other and a thin layer of electric conducting material arranged in the center of the active material and in electric contact with both frames or grids.

Des Moines, Iowa, May 24, 1911.

ALBERT L. CHAMBERLIN.

Witnesses:
M. WALLACE,
M. PETERSON.